H. R. WISE.
TRANSMISSION GEARING.
APPLICATION FILED APR. 5, 1909.
992,321.
Patented May 16, 1911.
4 SHEETS—SHEET 4.
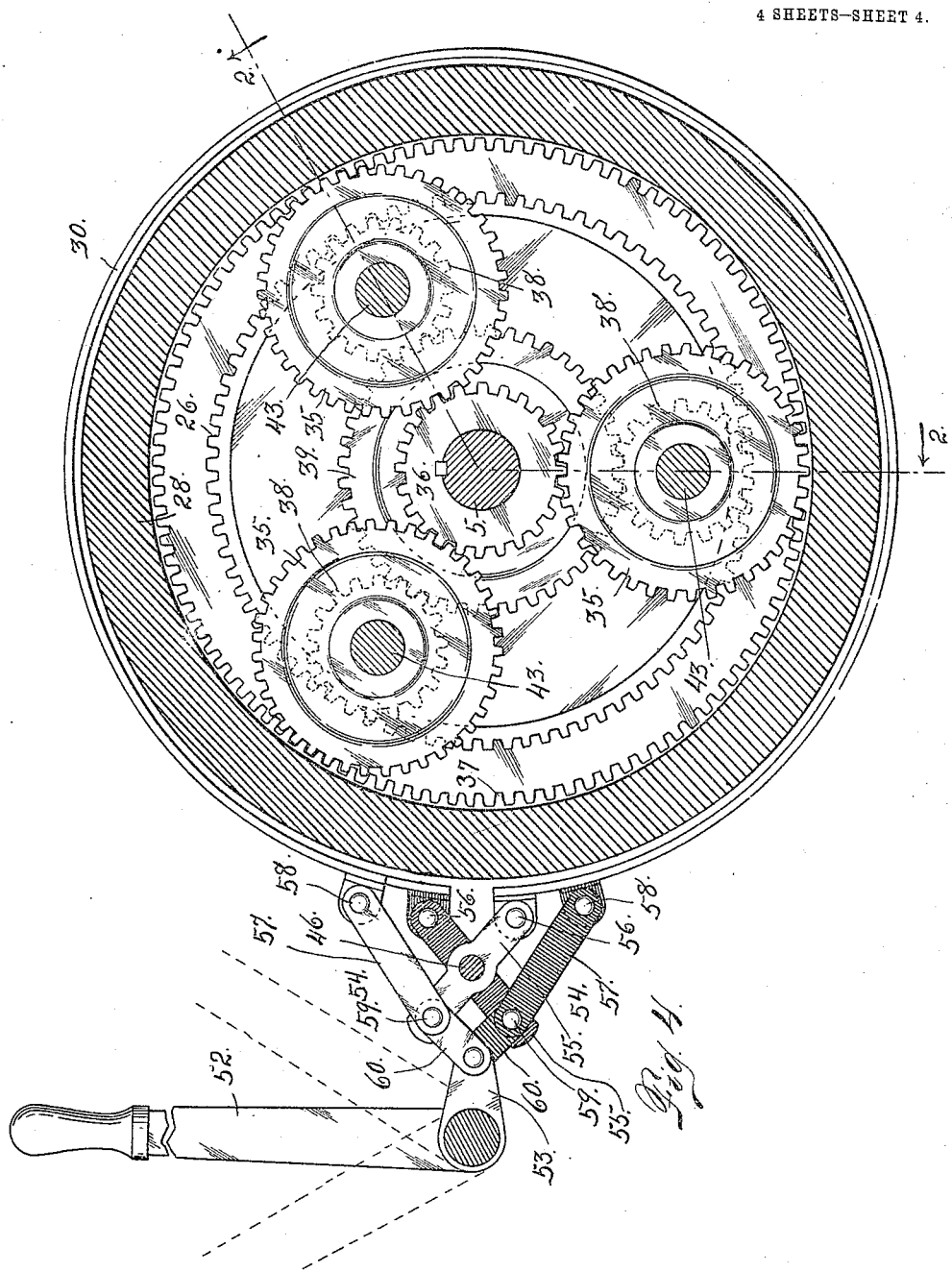
Witnesses
Otto E. Hoddick.
J. D. Thornburgh.
Inventor
Henry R. Wise.
By
Attorney

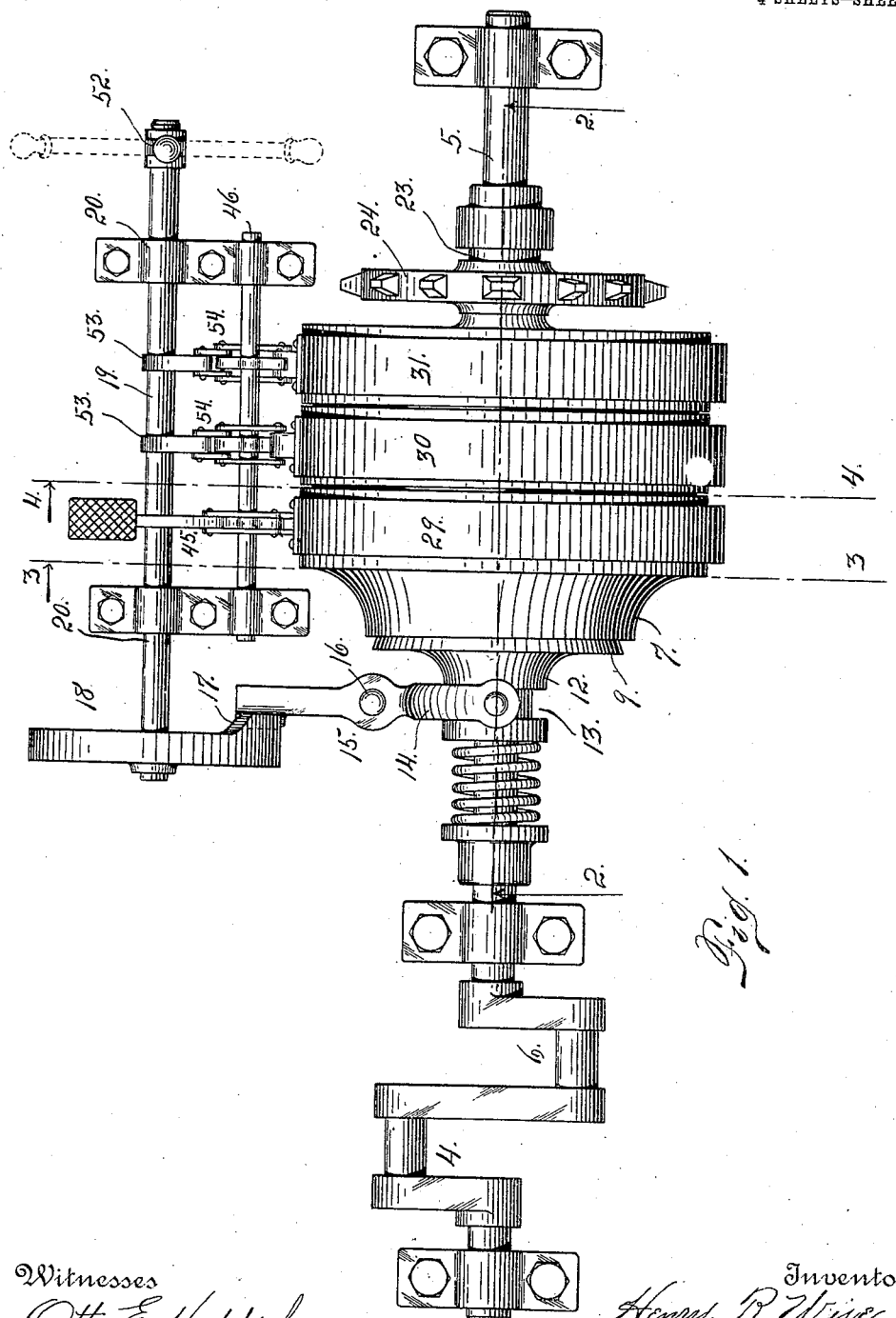

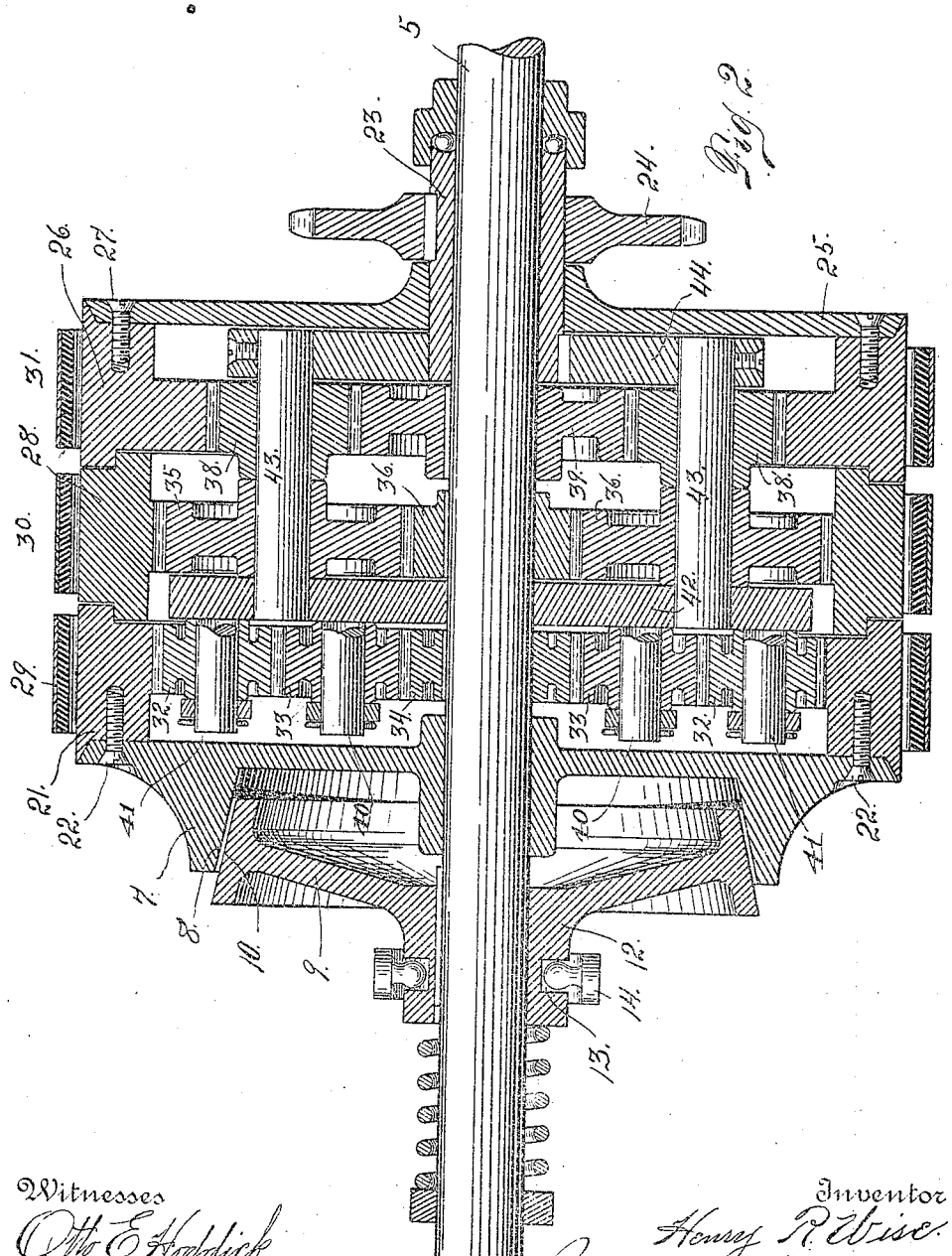

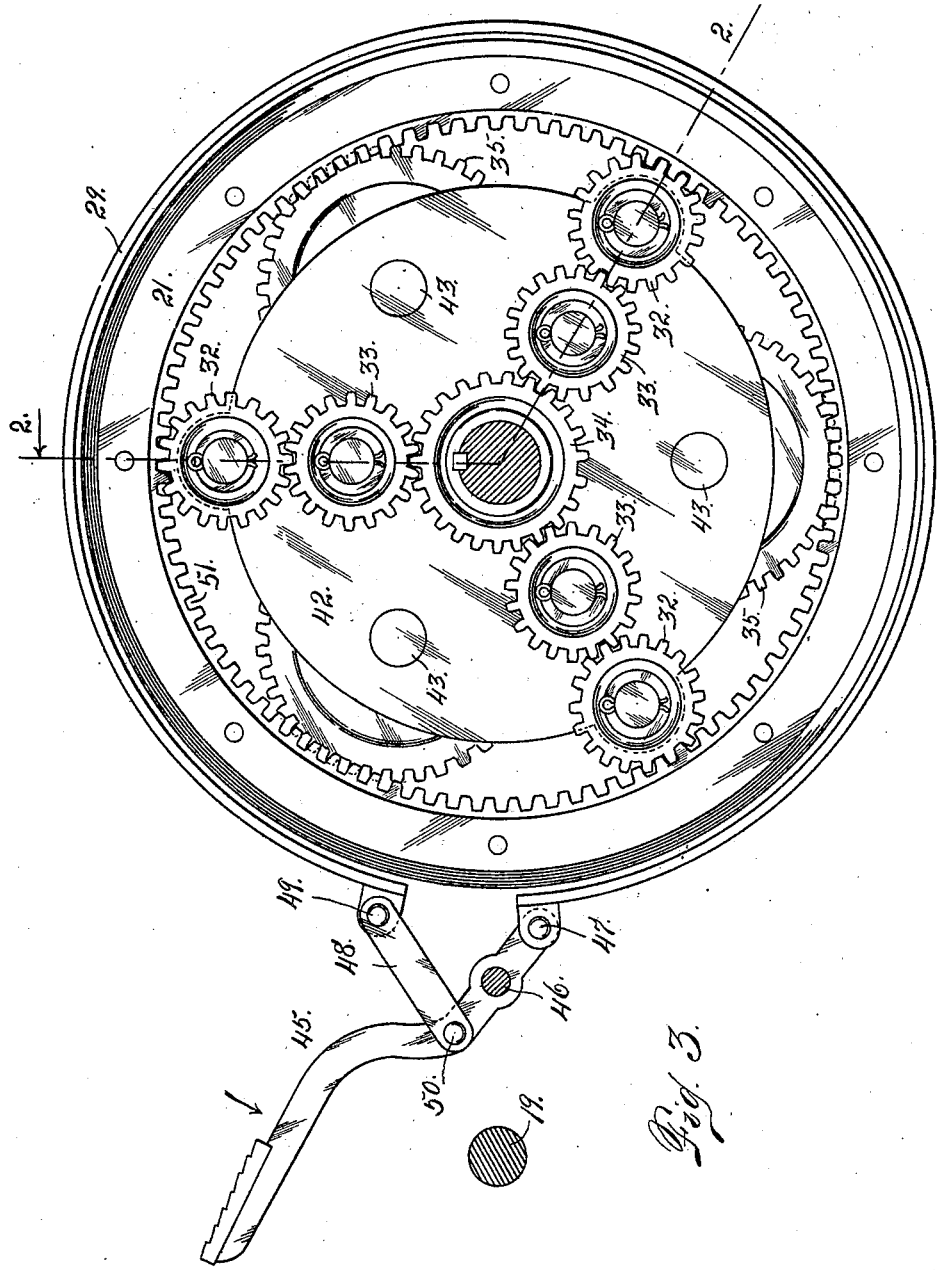

UNITED STATES PATENT OFFICE.

HENRY ROY WISE, OF DENVER, COLORADO.

TRANSMISSION-GEARING.

992,321.  Specification of Letters Patent.  Patented May 16, 1911.

Application filed April 5, 1909.  Serial No. 488,127.

*To all whom it may concern:*

Be it known that I, HENRY ROY WISE, a citizen of the United States, residing at the city and county of Denver and State of Colorado, have invented certain new and useful Improvements in Transmission-Gearing, and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to improvements in transmission gearing, my object being to provide a device adapted for use in transmitting motion from an operating power shaft, to the device to be operated, at variable speeds.

In my improved construction I mount a number of gears upon the operating shaft, the gears being keyed to rotate with the shaft. Connected with each of these initial gears are one or more other gears lying in the same plane, the outermost gear in each case meshing with a relatively large annular gear interiorly cogged for the purpose. These annular gears are each surrounded by a brake band and when the latter is clamped thereon, the annular gear is locked against rotation and becomes an orbit or track upon which the outermost gear of the corresponding train of gears or that lying in the same plane, travels. The shafts upon which the gears of each train are mounted, are connected with a plate or disk, the latter in turn being secured to a sleeve or other part from which motion is to be communicated to the mechanism to be operated. The shafts of the gears of each train of gears, are all connected with the same plate or operating disk and when the brake-band of any annular gear is actuated to clamp the latter against rotation, the corresponding train of gears travels around within the stationary annular gear as an orbit and during this travel carries with it the operated disk which transmits motion to the desired mechanism, the speed depending upon the train of gears which transmits the motion. By virtue of this arrangement, the speed transmitted may be either greater or less than the speed of the operating shaft and in order to change the speed it is only necessary to apply the brake- band to the annular gear corresponding with the train of gears which it is desired to utilize for operating the machine.

Having briefly outlined my improved construction, I will proceed to describe the same in detail reference being made to the accompanying drawing in which is illustrated an embodiment thereof.

In this drawing, Figure 1 is an elevation of my improved transmission gearing. Fig. 2 is a section taken therethrough, cutting the train of gears farthermost to the left, on the line 2—2 Fig. 3, and the other two trains of gears on the line 2—2 Fig. 4. Fig. 3 is a cross section taken on the line 3—3 Fig. 1. Fig. 4 is a section taken on the line 4—4 Fig. 1.

The same reference characters indicate the same parts in all the views.

Let the numeral 5 designate the operating shaft which it may be presumed is actuated from the engine of an automobile or any other desired mechanism. As shown in the drawing the shaft is equipped with cranks 6 and 4 for operating purposes.

Applied to the shaft at one end of the mechanism is a head 7, which is loose on the shaft. This head is cut out to form a chamber 8 adapted to receive a friction clutch member 9, the inner wall of the head 7 being inclined to cause the friction face 10 of the clutch member which is of counterpart shape to wedge thereinto for operating purposes. Upon the collar 12 of the clutch member 9, which is provided with a circumferential groove 13, is mounted a yoke 14 connected with one extremity of a lever 15 fulcrumed at 16. The outer extremity of this lever is adapted to engage a cam member 17 formed on a disk 18 fast on a manipulating shaft 19 mounted in bearings 20.

The head 7 is connected near its outer edge with the adjacent annular gear 21 by means of screws 22 or other suitable fastening devices, whereby the said annular gear is held in place when the mechanism is assembled.

At the extremity of the device remote from the clutch 9, is a sleeve 23, upon which is mounted a sprocket wheel 24, which may be connected with any suitable device to be operated. Surrounding the sleeve 23, and loose thereon is a head 25, remote from the clutch head 7. The outer edge of the head 25 is connected with an annular gear 26 by means of screws 27. Between the annular gears 21 and 26, is a third annular gear 28. The different annular gears 21, 28 and 26 are surrounded by brake-bands 29, 30 and 31, respectively. The annular gear 21 is connected with a train of gears 32, 33 and 34 commencing at the outermost and naming them in their order extending inwardly toward the shaft. Of course, for each gear 34 which is mounted upon and made fast to the shaft 5, there may be several sets of gears each set being composed of a pair of gears 32 and 33. By reference to Fig. 3, it will be seen that there are three sets of gears 32 and 33. Connected with the annular gear 28, are two gears 35 and 36. The gear 35 meshes directly with the cogged surface 37 of the annular gear 28, while the gear 36 is mounted directly upon the shaft 5. As shown in the drawing (see Fig. 4), there are three gears 35, all of which mesh with the central gear 36 and also with the cogged face of the annular gear 28. The annular gear 26 is connected with gears 38 and 39, the latter being mounted directly upon the shaft 5, while the gear 38 is interposed between the gear 39 and the annular gear 26. The gears 32 and 33 of one train, are mounted upon shafts 40 and 41 respectively, the said shafts also having bearings in a disk or revolving plate 42 loosely mounted on the shaft 5, and interposed between the various sets of gears composed of the members 35 and 36. The gears 35 of one train of gears and the gears 38 of another train of gears, are journaled upon shafts 43, one extremity of which is connected with the revolving disk 42, while their opposite extremities are connected with a disk 44 which surrounds and is made fast to the sleeve 23.

In the operation of my improved transmission mechanism, it is necessary to apply the band brakes to the outer surfaces of their respective annular gears as circumstances may require. The brake 29 may be tightened upon the gear 21 by means of a foot lever 45 fulcrumed at 46, one extremity of the lever being directly connected with one end of the band brake, as shown at 47, while the other extremity of the brake is connected with the lever by a link 48 whose extremities are respectively connected with the brake band and lever at points 49 and 50 (see Fig. 3). By virtue of the connection shown, it will be understood that if the lever 45 is moved in the direction indicated by the arrow in Fig. 3, the brake-band 29 will be tightened upon the annular gear 21. In this event, the annular gear will be locked against rotation, and motion will be transmitted from the shaft 5 first to the gear 34, and then successively to the gears 33 and 32, whereby the last named gear will be caused to travel in the cogged path 51 formed upon the inner face of the annular gear 21. During this operation, the disk 42 will be carried around with the gears 32 and 33, and as the shafts 43 take bearing in the disk 42, the disk 39 will also be rotated, and motion transmitted to the sleeve 23 at the speed determined by the operating trains of gears composed of the various sets of gears 32, 33 and 34. During this time, the other trains or sets of gears move idly since the annular gears 28 and 26 are free to rotate.

If it is desired to transmit to the sleeve 23 from the shaft 5, motion at a speed to be determined by either the sets or trains of gears, one of which is composed of the gears 35 and 36, the other being composed of the gears 38 and 39, the band brake 30 or 31 as the case may be, will be tightened upon its respective annular gear 28 or 26. In this event one of the gears 35 or 38 will travel around the path or orbit formed by the cogged inner face of the corresponding annular gear, whereby the shafts 43, together with the disks 42 and 39, are carried around at a speed depending upon that of the train of gears in commission.

The mechanism for tightening the brake-bands upon the annular gears 26 and 28, is illustrated in Figs. 1 and 4. In each case, the rock shaft 19 which is provided with an operating arm 52, is equipped with a crank arm 53, connected by links 54, with the opposite extremities of each brake-band. Each of these link connections is composed of a lever 55 fulcrumed at 46 and having one extremity pivotally connected with a brake-band as shown at 56. A link 57 is connected at 58 with the opposite extremity of the same brake-band from the opposite end of the link 57 being pivotally connected with the lever 55 as shown at 59. A second link 60 is connected with the lever 55 at 59 at one extremity and with a crank arm 53 at the other extremity. As the two sets of link connections for both brake-bands 30 and 31, are precisely similar, the corresponding parts of both sets are designated by the same reference characters.

Having thus described my invention, what I claim is:

1. In a transmission gearing the combination of an operating shaft and a member to be operated, a number of annular gears surrounding the shaft and having their axes coincident therewith, a train of gears interposed between the shaft and each annular gear, one gear of each train being fast on the shaft, and another gear of each train being in mesh with its corresponding annular gear, the shafts of the interposed gears of one train being connected in operative relation with one side of the member to be operated, while the shafts of the interposed gears of the other trains are connected in operative relation with the other side of the member to be operated, and suitable means for locking any annular gear against movement during the operation of the shaft, whereby a speed is transmitted from the shaft to the member to be operated corresponding to that developed by the train of gears, substantially as described.

2. The combination with an operating shaft, and a member to be operated, the last named member being mounted coaxially with the shaft, of a number of annular gears surrounding the shaft coaxially therewith, a train of gears interposed between the shaft and each of the several annular gears, the innermost gear of each train being fast on the shaft, and the outermost gear of each train being in mesh with the adjacent annular gear, shafts upon which the gears of each train, beyond the gears upon the shaft, are mounted, the shafts of the interposed gears of one train being connected in operative relation with one side of the member to be operated, while the shafts of the interposed gears of the other trains, are connected with the other side of the member to be operated, and means for independently locking each annular gear against movement, substantially as described.

3. A transmission gearing, comprising in combination with an operating shaft, two members to be operated, a number of annular gears surrounding the said shaft, a train of gears interposed between each annular gear and the shaft, the innermost gear of each train being fast on the shaft, and the outermost gear of each train meshing with the adjacent gear, the members to be operated being coaxially journaled on the shaft, shafts upon which the interposed gears of each train are mounted, the shafts upon which the interposed gears of one train are mounted being connected in operative relation with one side of one member to be operated, while the shafts upon which the other trains of interposed gears are mounted are connected in operative relation with the other member to be operated, and with the opposite side of the member to be operated upon which the shafts of the first named interposed gears are mounted, and means for independently locking each of the annular gears against movement, whereby the outermost gear of any train may be caused to travel around its adjacent annular gear as an orbit, transmitting to the operating members a speed from the operating shaft corresponding with that developed by the train of gears, whose adjacent annular gear is locked against movement, substantially as described.

In testimony whereof I affix my signature in presence of two witnesses.

HENRY ROY WISE.

Witnesses:
JESSIE HOBART,
A. EBERT O'BRIEN.